US010554282B2

(12) United States Patent
Kim et al.

(10) Patent No.: US 10,554,282 B2
(45) Date of Patent: Feb. 4, 2020

(54) METHOD AND DEVICE FOR DETERMINING RANK-RELATED INFORMATION IN WIRELESS COMMUNICATION SYSTEM

(71) Applicant: Samsung Electronics Co., Ltd., Gyeonggi-do (KR)

(72) Inventors: Sangbum Kim, Gyeonggi-do (KR); Soenghun Kim, Gyeonggi-do (KR); Jaehyuk Jang, Gyeonggi-do (KR); Himke Van Der Velde, Zwolle (NL); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/744,656

(22) PCT Filed: Jul. 26, 2016

(86) PCT No.: PCT/KR2016/008168
§ 371 (c)(1),
(2) Date: Jan. 12, 2018

(87) PCT Pub. No.: WO2017/018783
PCT Pub. Date: Feb. 2, 2017

(65) Prior Publication Data
US 2018/0198502 A1 Jul. 12, 2018

Related U.S. Application Data

(60) Provisional application No. 62/197,383, filed on Jul. 27, 2015, provisional application No. 62/316,056, filed on Mar. 31, 2016.

(51) Int. Cl.
*H04K 1/10* (2006.01)
*H04L 27/28* (2006.01)
(Continued)

(52) U.S. Cl.
CPC ............ *H04B 7/063* (2013.01); *H04B 7/046* (2013.01); *H04B 7/0628* (2013.01);
(Continued)

(58) Field of Classification Search
CPC ..... H04B 7/063; H04B 7/046; H04W 72/048; H04W 16/32; H04W 72/06; H04W 72/0406; H04W 8/24
(Continued)

(56) References Cited

U.S. PATENT DOCUMENTS

2012/0178448 A1 7/2012 Yuk et al.
2012/0307648 A1 12/2012 Okubo et al.
(Continued)

FOREIGN PATENT DOCUMENTS

WO WO 2014110807 7/2014

OTHER PUBLICATIONS

PCT/ISA/210 Search Report issued on PCT/KR2016/008168 (pp. 3).
(Continued)

*Primary Examiner* — Phuong Phu
(74) *Attorney, Agent, or Firm* — The Farrell Law Firm, P.C.

(57) ABSTRACT

The present disclosure relates to a 5G or pre-5G communication system for supporting a higher data transmission rate than a 4G communication system such as LTE. The present invention relates to a method and a device for determining rank-related information, the method of user equipment according to the present invention comprising: a step of transmitting, to an eNB, a user equipment capability information message including capability information of the user equipment; a step of receiving a configuration message from the eNB; and a step of determining rank-related information
(Continued)

on the basis of whether or not layer-related information is included in the configuration message.

20 Claims, 8 Drawing Sheets

(51) Int. Cl.
    *H04B 7/06*         (2006.01)
    *H04B 7/0456*      (2017.01)
    *H04W 72/04*       (2009.01)
    *H04W 72/06*       (2009.01)
    *H04W 8/24*        (2009.01)
    *H04W 16/32*       (2009.01)

(52) U.S. Cl.
    CPC ......... *H04W 72/048* (2013.01); *H04W 72/06* (2013.01); *H04B 7/0486* (2013.01); *H04W 8/24* (2013.01); *H04W 16/32* (2013.01)

(58) Field of Classification Search
    USPC ........................................................ 375/260
    See application file for complete search history.

(56) References Cited

U.S. PATENT DOCUMENTS

| | | |
|---|---|---|
| 2014/0010223 A1 | 1/2014 | Wang et al. |
| 2014/0045497 A1 | 2/2014 | Abe et al. |
| 2014/0247743 A1 | 9/2014 | Seo |
| 2014/0295840 A1 | 10/2014 | Keskitalo et al. |
| 2014/0301297 A1 | 10/2014 | Geirhofer et al. |
| 2014/0369308 A1* | 12/2014 | Gerstenberger .. H04W 72/0406 370/329 |
| 2015/0031367 A1 | 1/2015 | Singh et al. |
| 2015/0296447 A1 | 10/2015 | Luo et al. |
| 2015/0318907 A1 | 11/2015 | Zhang et al. |
| 2016/0100378 A1 | 4/2016 | Chang et al. |
| 2017/0127306 A1 | 5/2017 | Tan Bergstrom et al. |
| 2018/0124774 A1* | 5/2018 | Takahashi ............... H04W 8/24 |

OTHER PUBLICATIONS

PCT/ISA/237 Written Opinion issued on PCT/KR2016/008168 (pp. 6).

U.S. Office Action dated Jan. 14, 2019 issued in counterpart U.S. Appl. No. 15/744,677, 28 pages.

European Search Report dated Jun. 7, 2018 issued in counterpart application No. 16828011.3-1215, 8 pages.

U.S. Office Action dated Aug. 7, 2019 issued in counterpart U.S. Appl. No. 15/744,677, 17 pages.

U.S. Advisory Action dated Oct. 24, 2019 issued in counterpart U.S. Appl. No. 15/744,677, 6 pages.

* cited by examiner

METHOD AND DEVICE FOR DETERMINING RANK-RELATED INFORMATION IN WIRELESS COMMUNICATION SYSTEM

PRIORITY

This application is a National Phase Entry of PCT International Application No. PCT/KR2016/008168 which was filed on Jul. 26, 2016, and claims priority to U.S. Provisional Patent Application Nos. 62/197,383 and 62/316,056, which were filed on Jul. 27, 2015 and Mar. 31, 2016, respectively, the content of each of which is incorporated herein by reference.

TECHNICAL FIELD

The present invention relates to a wireless communication system and, in particular, to a method for determining rank-related information in a wireless communication.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the rapid advance of wireless communication technology, the communication systems have evolved to the 4th Generation mobile communication systems represented by the LTE system. The LTE system employs several key technologies to meet the demand of increasing traffic, and carrier aggregation (CA) is one of such technologies. CA is a technique to use one or more component carriers in addition to a primary component to increase the data rate between a terminal (hereinafter, referred to as User Equipment or UE) and a base station (hereinafter, referred to as evolved Node B or eNB) in proportion to the number of component carriers, which is unlike the legacy communication system that uses one component carrier.

With the introduction of CA, it has become necessary for the UE to include information on the combination bands (hereinafter, referred to as band combination information) in the UE capability information. In the respect, there is a need of a method for the UE to determine rank-related information based on the layer information, especially when the layer information indicated by the category information included in the UE capability information is different from the layer information indicated by the frequency band combination information.

DISCLOSURE

Technical Problem

The present invention has been conceived to solve the above problem and aims to provide a method for determining rank-related information between a UE and an eNB. In detail, the present invention provides a rank indicator communication method in which a UE reports to an eNB whether it supports rank-3 and rank-4 in transmission mode (TM) 3 and TM4, the eNB configures TM3 and TM4 to the UE, the UE and eNB determine the rank-related information according to a rule agreed between the UE and eNB, and the UE and eNB communicate a rank indicator determined based on the rank-related information.

Technical Solution

In accordance with an aspect of the present invention, a method of a terminal comprises transmitting a terminal capability information message including terminal capability information to a base station, receiving a configuration message from the base station, and determining rank-related information based on whether the configuration message includes layer-related information.

In accordance with another aspect of the present invention, a method of a base station comprises receiving a terminal capability information message including terminal capability information from a terminal, transmitting a configuration message to the terminal, and determining rank-related information based on whether the configuration message includes layer-related information.

In accordance with another aspect of the present invention, a terminal comprises a transceiver configured to transmit and receive signals to and from another network entity and a controller configured to transmit a terminal capability information message including terminal capability information to a base station, receive a configuration message from the base station and determine a rank-related information based on whether the configuration message includes layer-related information.

In accordance with still another aspect of the present invention, a base station includes a transceiver configured transmit and receive signals to and from another network entity and a controller configured to receive a terminal capability information message including terminal capability information from a terminal, transmit a configuration message to the terminal and determine rank-related information based on whether the configuration message includes layer-related information.

Advantageous Effects

The rank-related information determination method of the present invention is advantageous in terms of minimizing signaling overhead in such a way of allowing a UE that supports ranks 3 and 4 in TMs 3 and 4 and a UE that does not support ranks 3 and 4 in TMs 3 and 4 to determine rank-related information using different rules.

MODE FOR INVENTION

Figure 1:
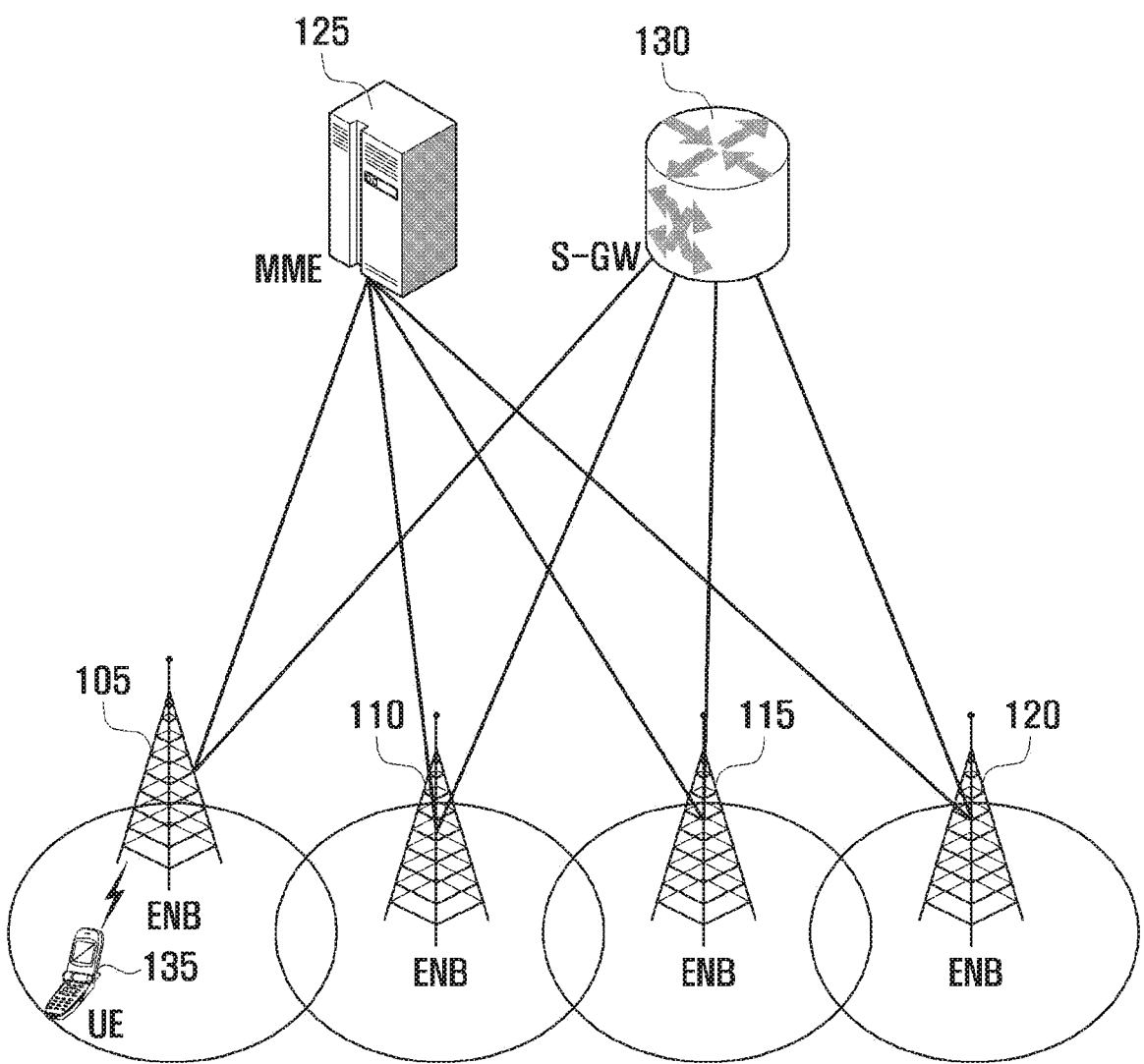
FIG. 1 is a diagram illustrating the architecture of an LTE system to which the present invention is applied.

Exemplary embodiments of the present invention are described in detail with reference to the accompanying drawings.

Detailed descriptions of well-known functions and structures incorporated herein may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Detailed descriptions of well-known functions and structures incorporated herein may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions, which are executed via the processor of the computer or other programmable data processing apparatus, create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions, which are executed on the computer or other programmable apparatus, provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

FIG. 1 is a diagram illustrating the architecture of an LTE system to which the present invention is applied.

In reference to FIG. 1, a radio access network (100) of the LTE system includes evolved Node Bs (hereinafter, interchangeably referred to as eNB, node B, and base station) 105, 110, 115, and 120; a mobility management entity (MME) 125; and a serving gateway (S-GW) 130. A user terminal (hereinafter, interchangeably referred to as user equipment (UE) and terminal) 135 connects to an external network via the eNBs 105, 110, 115, and 120 and the S-GW 130.

The eNBs 105, 110, 115, and 120 are equivalent to the legacy node Bs of the universal mobile telecommunications system (UMTS). The UE 135 connects to one of the eNBs via a radio channel, and the eNB has more control functions than the legacy node B. In the LTE system where all user traffic including real time services such as Voice over IP (VoIP) is served through shared channels, it is necessary to schedule UEs based on scheduling information such as buffer status, power headroom status, and channel status collected from the UEs, and an eNB serving the UEs takes charge of this function.

For example, the LTE system adopts orthogonal frequency division multiplexing (OFDM) as a radio access technology to secure a data rate of up to 100 Mbps in a bandwidth of 20 MHz. The LTE system also adopts adaptive modulation and coding (AMC) to determine the modulation scheme and channel coding rate in adaptation to the channel condition of the UE.

The S-GW 130, as an entity handling bearers, establishes and releases data bearers under the control of the MME 125.

The MME 125 takes charge of various control functions and maintains connections with a plurality of eNBs.

Figure 2:
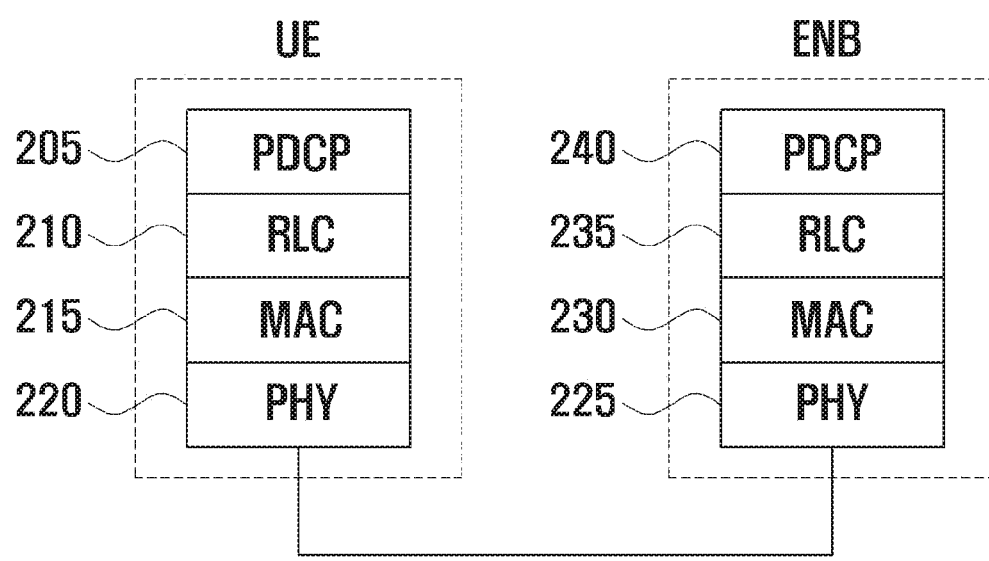
FIG. 2 is a diagram illustrating a protocol stack of an interface between a UE and an eNB in the LTE system to which the present invention is applied.

FIG. 2 is a diagram illustrating a protocol stack of an interface between a UE and an eNB in the LTE system to which the present invention is applied.

As shown in FIG. 2, the protocol stack of the interface between the UE and the eNB in the LTE system includes a plurality of protocol layers stacked from the bottom to the top: physical layer denoted by reference numbers 220 and 225, medium access control (MAC) layer denoted by reference numbers 215 and 230, radio link control (RLC) layer denoted by reference numbers 210 and 235, and packet data convergence control (PDCP) layer denoted by reference numbers 205 and 240.

The PDCP layer denoted by reference numbers 205 and 240 may take charge of compressing/decompressing an IP header.

The RLC layer denoted by reference numbers 210 and 235 may take charge of reformatting PDCP packet data units (PDUs) in order to fit them in size for automatic repeat request (ARQ).

The MAC layer denoted by reference numbers 215 and 230 may allow for connection of multiple RLC entities established for one UE and take charge of multiplexing RLC PDUs from the RLC layer into a MAC PDU and demultiplexing a MAC PDU into RLC PDUs.

The PHY layer denoted by reference numbers 220 and 225 takes charge of channel-coding and modulation on higher layer data to generate and transmit OFDM symbols over a radio channel and demodulating and channel-decoding on OFDM symbols received over the radio channel to deliver the decoded data to the higher layers.

Figure 3:
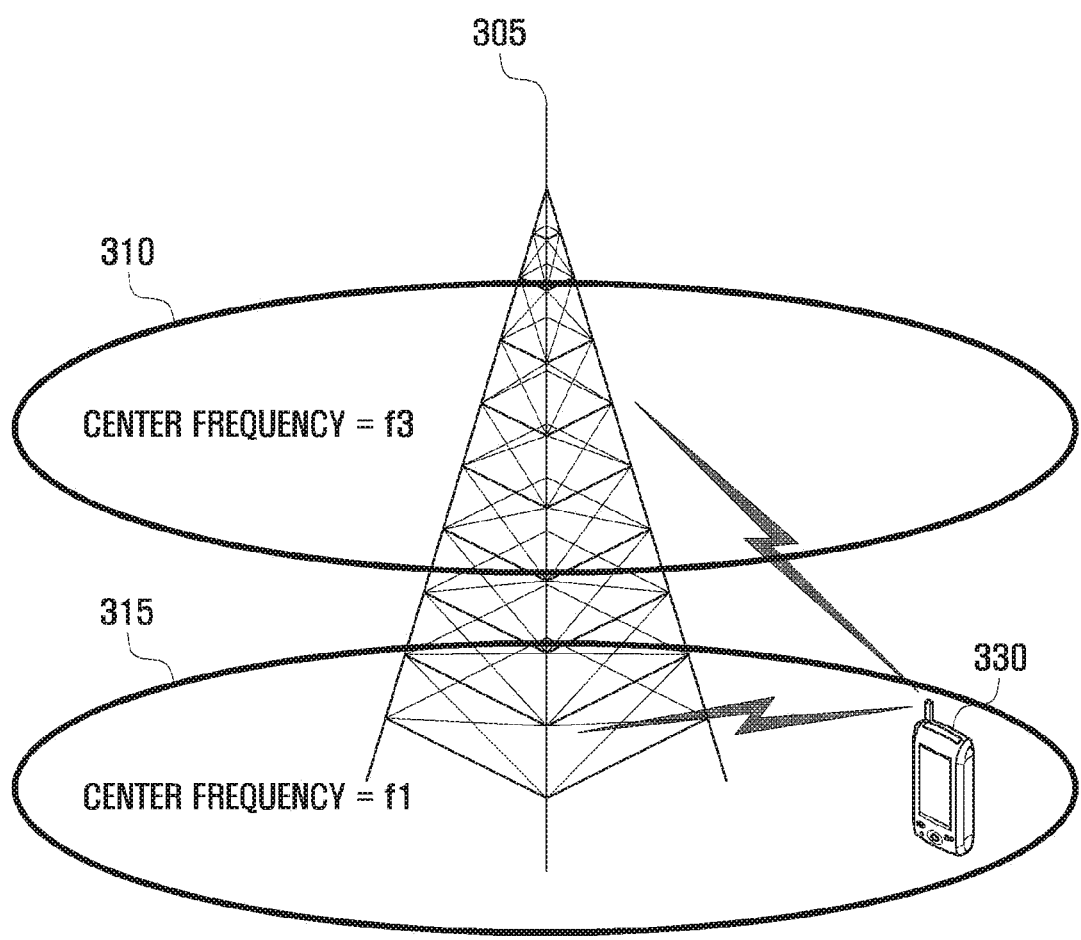
FIG. 3 is a diagram illustrating intra-eNB carrier aggregation in an LTE-A system.

FIG. 3 is a diagram illustrating intra-eNB carrier aggregation in an LTE-A system.

In reference to FIG. 3, an eNB may transmit and receive signals through multiple carriers across a plurality of frequency bands. For example, if the eNB 305 operates on two downlink frequencies with respective center frequencies f1 and f3 (carriers 315 and 310), a legacy UE may receive data on one of the two frequencies (carriers 315 and 310).

However, it may be possible for the CA-enabled UE to transmit/receive data using multiple carriers. Accordingly, the eNB 305 may allocate resources to the CA-enabled UE 330 in adaptation to the channel condition of the UE 330 in a direction of increasing data rate. Aggregating downlink subcarriers or uplink subcarriers operated by the eNB 305 is called intra-eNB CA. However, unlike the intra-CA situation as shown in FIG. 3, there is a need of aggregating downlink or uplink carriers operated by different eNBs.

In the following description, the terms and definitions given in the LTE standard TS36.211, 36.212, 36.213, and 36.331 are used.

Meanwhile, multiple-input multiple output (MIMO) techniques can be used to improve frequency utilization efficiency with a plurality of antennas. In LTE, multiple transmission modes (TMs) are defined and, among them, TM3 and TM4 are defined for cell-specific reference signal-based (CRS-based) MIMO operations. TM3 is an open-loop MIMO transmission mode, and TM4 is a closed-loop MIMO transmission mode.

In MIMO, as the channel condition becomes better, the eNB increases the number of antennas for data transmission to achieve a higher data rate. This operation is explained with the concept of layer; the number of layers is closely related to the number of antennas and, if the number of layers increases, the data rate increases. The UE operating in TM3 or TM4 transmits a rank indicator (RI) to the serving eNB periodically, RI indicating the number of layers available for downlink transmission. For example, if the UE reports rank-1, this means that it is the most efficient for the UE to receive only 1 layer in the current channel condition; if the UE reports rank-3, this means that it is available for the UE to receive up to 3 layers.

Although rank-3 and rank-4 can be supported in TM9 and TM10 that are defined as demodulation reference signal-based (DMRS-based) transmission modes, it may be advantageous to not use rank-3 and rank-4 in TM3 and TM4 as CRS-based transmission modes. For example, a UE operating in TM3 or TM4 may not use rank-3 and rank-4 in a network to which the UE connects frequently. In this respect, configuring the UE to not support rank-3 and rank-4 in TM3 and TM4 may bring down the price of the UE. Of course, there may be a UE that supports rank-3 and rank-4 in both the DMRS-based and CRS-based transmission modes.

Meanwhile, the UE may determine information related to the bit-width of RI (hereinafter, referred to as rank-related information) for use in transmitting RI.

In detail, the UE may transmit to the eNB a message (UE capability information message) containing UE capability information (UEcapability). The UE capability information may include UE category information (UE-category). The UE category information may include a number of layers available for the UE (hereinafter, referred to as first layer-information). Accordingly, the UE may determine the rank-related information based on the first layer-information. The UE may also determine the rank-related information based on the first layer-information and the number of layers maximally available for the eNB. For example, it is may be possible to determine the rank-related information based on the first layer-information and the minimum value of the number of layers maximally available for the eNB The UE capability information may include band combination information indicative of a combination of frequency bands supported by the UE. The band combination information may include a number of layers per band combination (hereinafter, referred to as second layer-information). Accordingly, there is a need of a method for determining one of the first and second layer-information when the first layer-information and the second layer-information are not identical with each other. For example, it may be possible to configure layers using the largest value between the first layer-information and second layer-information.

The eNB may transmit to the UE the information indicative of the number of layers to be applied explicitly. However, even when the first layer-information and the second layer-information are identical with each other, the eNB may transmit to the UE the information indicative of the number of layers to be applied explicitly.

The present invention proposes an RI transmission/reception method and device characterized in that the UE reports to the eNB the information on whether it supports rank-3 and rank-4 in TM3 and TM4, the eNB configures TM3 or TM4 to the UE based on the information, and the UE and eNB communicate the RI based on the rank-related information (RI bit-width) determined according to a predetermined rule. Particularly, it may be possible to minimize signaling overhead in such a of allowing a UE that supports ranks 3 and 4 in TMs 3 and 4 and a UE that does not support ranks 3 and 4 in TMs 3 and 4 to transmit the RI bit-width using different rules. Although the description is directed to the cases where a UE is operating in TM3 and TM4 for convenience of explanation, the present invention is not limit to the exemplary cases, and it can be applied to the cases where the UE is operating in other transmission modes.

Figure 4:
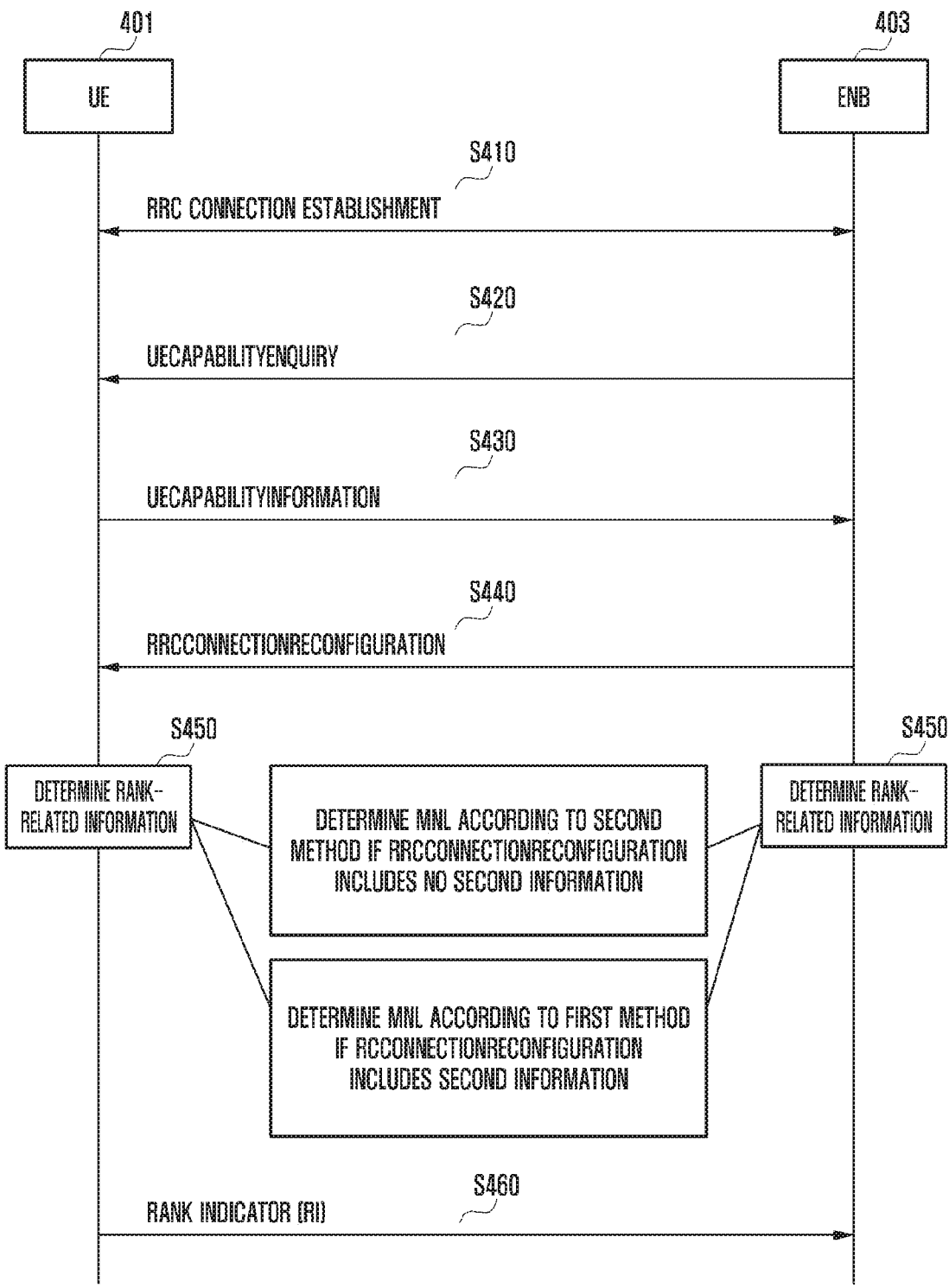
FIG. 4 is a signal flow diagram illustrating signal flows between a UE and an eNB in a rank-related information determination procedure according to an embodiment of the present invention.

FIG. 4 is a signal flow diagram illustrating signal flows between a UE and an eNB in a rank-related information determination procedure according to an embodiment of the present invention.

In reference to FIG. 4, in a mobile communication system including a UE 401, an eNB 403, and at least one other node, the UE 401 may establish a radio resource control (RRC) connection with the eNB 403 at step S410. If a UE and an eNB establish an RRC connection, this means that a signaling radio bearer is established between the UE and the eNB to exchange RRC messages. The RRC connection is established through a random-access procedure; the RRC connection establishment procedure includes transmitting an RRC connection establishment request message from the UE to the eNB, transmitting an RRC connection establishment message from the eNB to the UE, and transmitting an RRC connection establishment complete message from the UE to the eNB.

After RRC connection establishment, if necessary, at step S420 the eNB may transmit to the UE a control message called UE capability enquiry (UECapabilityEnquiry) to enquire about UE capability (or UE capability information). The eNB may transmit the UE capability enquiry message to the UE through higher layer signaling (e.g., RRC layer signaling).

The UE capability enquiry message may include an RAT type field indicative of the type of radio access technology (RAT) to enquire about the UE capability for the corresponding RAT. For example, if it is intended to enquire about evolved UMTS Terrestrial radio access (EUTRA) capability of the UE, the eNB may set the RAT type to EUTRA. However, the present invention is not limited thereby.

If a UE capability enquiry (UECapabilityEnquiry) message including the RAT type set to EUTRA is received, the UE may transmit to the eNB a UE capability information (UECapabilityInformation) message including the EUTRA capability of the UE at step S430. The UE may transmit the UE capability information message to the eNB through RRC layer signaling.

The UE capability information message may include UE capability information (UE-EUTRA-Capability), which may include a list of features supported by the UE (UE feature list), category information (ue-Category), and information on the frequency band combinations supported by the UE (supportedBandCombination).

The supported band combination information (supportedBandCombination) may include one or more band combination parameters (BandCombinationParameters), and a band combination parameter may correspond to a frequency band combination supported by the UE. The band combination parameters (BandCombinationParameters) may include one or more band parameters (BandParameters). For example, if the UE supports the combination of band X and band Y, the UE may include the band combination parameter (BandCombinationParameters) indicative of the corresponding combination in the supported band combination information (supportedBandCombination). The band combination parameter (BandCombinationParameters) may include band parameters (BandParameters) for band X and band parameters (BandParameters) for band Y.

The band parameters (BandParameters) per band may include a frequency band indicator indicating the corresponding band, an uplink parameter of the corresponding band (bandParametersUL or, hereinafter, interchangeably referred to as uplink-related band parameter), and a downlink parameter of the corresponding band (bandParametersDL or, hereinafter, interchangeably referred to as downlink-related band parameter).

The uplink-related band parameter and the downlink-related band parameter may be comprised of the same elements, and the downlink-related band parameter may be described as follows.

The downlink-related band parameter (BandParametersDL) may include a ca-BandwidthClassDL and supportedMIMO-CapabilityDL.

The ca-BandwidthClassDL is a parameter indicating a number of serving cells aggregable in each band of the corresponding band combination and maximum bandwidth (MHz) possible with the aggregated serving cells using one of the letters A to F. This parameter may be set to A to indicate that only one serving cell can be configured for up to 10 MHz system bandwidth or C to indicate that up to 2 serving cells can be configured for up to 20 MHz system bandwidth.

The supportedMIMO-CapabilityDL is a parameter indicating MIMO capability available in a bandwidth of the corresponding band combination, i.e., maximum number of layers. One band parameter (BandParameters) may include multiple supportedMIMO-CapabilityDL parameters.

The UE may transmit the information indicating whether it supports "Rank-3 or Rank-4 in TM3 or TM4" for the band combination parameters fulfilling a predetermined condition (hereinafter, referred to as first information) in addition to the aforementioned information.

The band combination fulfilling the predetermined condition may be the band combination reported with the indication of supporting up to 4 layers in at least one supportedMIMO-CapabilityDL (i.e., at least one supportedMIMO-CapabilityDL is set to four Layers).

The first information may be interpreted as the information indicating whether the UE supports up to 4 layers in TM3 or TM4. If the first information is configured in the UE capability information, this may mean that the UE supports transmission of up to 4 layers in TM3 or TM4. Accordingly, 1-bit information may be added to indicate presence/absence of the first information per band combination and, if the 1-bit information indicates presence of the first information, this may mean that the UE has passed an inter-operability test (IOT) as well as that it supports "Rank-3 or Rank-4 in TM3 or TM4" for the corresponding band combination. If the 1-bit information indicates absence of the first information, this may mean that the UE does not support "Rank-3 or Rank-4 in TM3 or TM4" or, although supporting "Rank-3 or Rank-4 in TM3 or TM4," that it has failed the IOT.

If the UE capability information message is received, the eNB 403 may determine whether to use 4 layers or Rank 3/4 in configuring TM3 or TM4 for the band combination with which the first information is set.

If it is determined to use 4 layers, the eNB may transmit to the UE 401 a control message (hereinafter, referred to as configuration message or RRC connection reconfiguration (RRCConnectionReconfiguration) message) at step S440. Although the description is made with the RRC reconfiguration message, the present invention is not limited thereby.

The eNB 403 may include information indicative of use of TM3 or TM4 (hereinafter, interchangeably referred to as TM-related information) and the layer-related information (hereinafter, interchangeably referred to as second information) in the RRC reconfiguration message. The layer-related information may mean the information related to the maximum number of layers.

Afterward, the UE 401 and the eNB 403 may determine the rank-related information (RI bit-width) at step S450. The UE and the eNB may determine the rank-related information (RI bit-width) based on whether the RRC connection reconfiguration message include the second information. The rank-related information may be determined based on the number of antenna ports and the maximum number of layers, and the UE 401 and the eNB 403 may determine the maximum number of layers differently depending on whether the RRC connection reconfiguration message includes the second information In detail, the UE 401 and the eNB 403 may determine the rank-related information using a function of the number of antenna ports and the maximum number of layers. The function of number of antenna ports and the maximum number of layers may be determined as exemplified in Table 1.

TABLE 1

| Field | 2 antenna ports | 4 antenna ports | | 8 antenna ports | | |
|---|---|---|---|---|---|---|
| | | MNL = 2 | MNL = 4 | MNL = 2 | MNL = 4 | MNL = 8 |
| Rank indication | 1 | 1 | 2 | 1 | 2 | 3 |

The number of antenna ports may be the number of antennas configured for a cell, and a transfer frequency of CRS per unit time may be determined differently according to the number of antennas. The number of antenna ports is related to the maximum number of layers available in the corresponding cell.

The maximum number of layers (MNL) may be related to the maximum number of layers the UE can use and may be determined according to a predetermined method.

In detail, the eNB 403 and the UE 401 may determine the maximum number of layers according to a first method for the case where the control message indicative of configuring TM3 or TM4 includes the second information or according to a second method for the case where the control message includes no second message.

After determining the rank-related information based on the maximum number of layers and antenna ports, the UE 401 may transmit an RI to the eNB 403 at step S460. Here, the RI transmitted from the UE 401 to the eNB 403 may be determined based on the rank-related information. Hereinafter, descriptions are made of the first and second method for determining the maximum number of layers.

<First Method>

If TM3 or TM 4 is configured for a serving cell and a control message configuring the transmission mode includes the second information, the MNL (for the serving cell) may be determined as the smallest one of the number of antenna ports of physical broadcast channel (PBCH) of the corresponding serving cell and a first constant. The first constant is described hereinafter.

The first constant may be determined based on the supportedMIMO-CapabilityDL included in the UE capability reported by the UE. In more detail, the first constant may be determined by the highest one among the downlink MIMO capabilities of the bands that are identical with those of the band of the cell configured with TM3 or TM4 for a band of the corresponding band combination.

The corresponding band combination may mean a band combination matching the current CA of the UE among the band combinations reported by the UE.

For example, it is assumed that the UE is configured with serving cell "a" operating in band A and serving cell "b" operating in band B. If serving cell "a" is configured with TM3 and if the maximum number of layers for band A (which has been reported in the downlink MIMO capability information) is 4, the first constant may become 4.

The first constant may be fixed at 4. In this case, the second information may be signaled along with the control information including the transmission mode indicator set to TM3 or TM4 for an arbitrary serving cell and, as described above, used as an indicator indicating one of the first and second methods for use in determining the rank-related information (RI bit-width) (or indicating whether to use the category information (ue-Category) or a predetermined constant for determining the MNL) for the serving cell. For example, if the control message includes the second information, the eNB and the UE may set the MNL to a predetermined constant; if the control message includes no second information, the eNB and the UE may use the second method (which uses the category information (ue-Category)).

The second method is used to determine the MNL based on the category information and is described later in detail.

The first constant may be set to a value indicated by the eNB among many available values. In this case, the second information may be signaled along with the control information indicative of configuring TM3 or TM4 for an arbitrary serving cell, by means of the RRC connection reconfiguration message. For example, the second information may be 2-bit information with fourLayers, eightLayers, and two spare values as code points. The second information may include the information indicative of one of twoLayers, fourLayers, and eightLayers. The second information may be configured only when the transmission mode of the UE is TM3, TM4, TM9, or TM10. Although the above description is directed to an exemplary case, the second information may be configured in other transmission modes. The UE and the eNB may determine the MNL based on the value indicated by the second information for the case where the control message includes the second information or according to the second method of using the category information for the case where the control message includes no second information.

<Second Method>

If the control message includes the transmission mode indicator set to TM3 or TM4 for the corresponding serving cell but no second information, the MNL (for the serving cell) may be determined as the smallest one of the number of PBCH antenna ports and a second constant. The second constant may mean the number of layers that is indicated by the category information (ue-Category) and determined as exemplified in Table 2.

TABLE 2

| UE Category | Maximum number of supported layers for spatial multiplexing in DL |
|---|---|
| Category 1 | 1 |
| Category 2 | 2 |
| Category 3 | 2 |
| Category 4 | 2 |
| Category 5 | 4 |
| Category 6 | 2 or 4 |
| Category 7 | 2 or 4 |
| Category 8 | 8 |
| Category 9 | 2 or 4 |
| Category 10 | 2 or 4 |
| Category 11 | 2 or 4 |
| Category 12 | 2 or 4 |

That is, if the RRC connection reconfiguration includes no second information, the eNB and the UE may analogize the second constant with the category information included in the UE capability information and Table 2 and determine the MNL based on the number of PBCH antenna ports and the second constant.

The eNB and the UE may determine the rank-related information based on the MNL determined according to one of the first and second methods and Table 1 and transmit an RI with the rank-related information.

Figure 5:
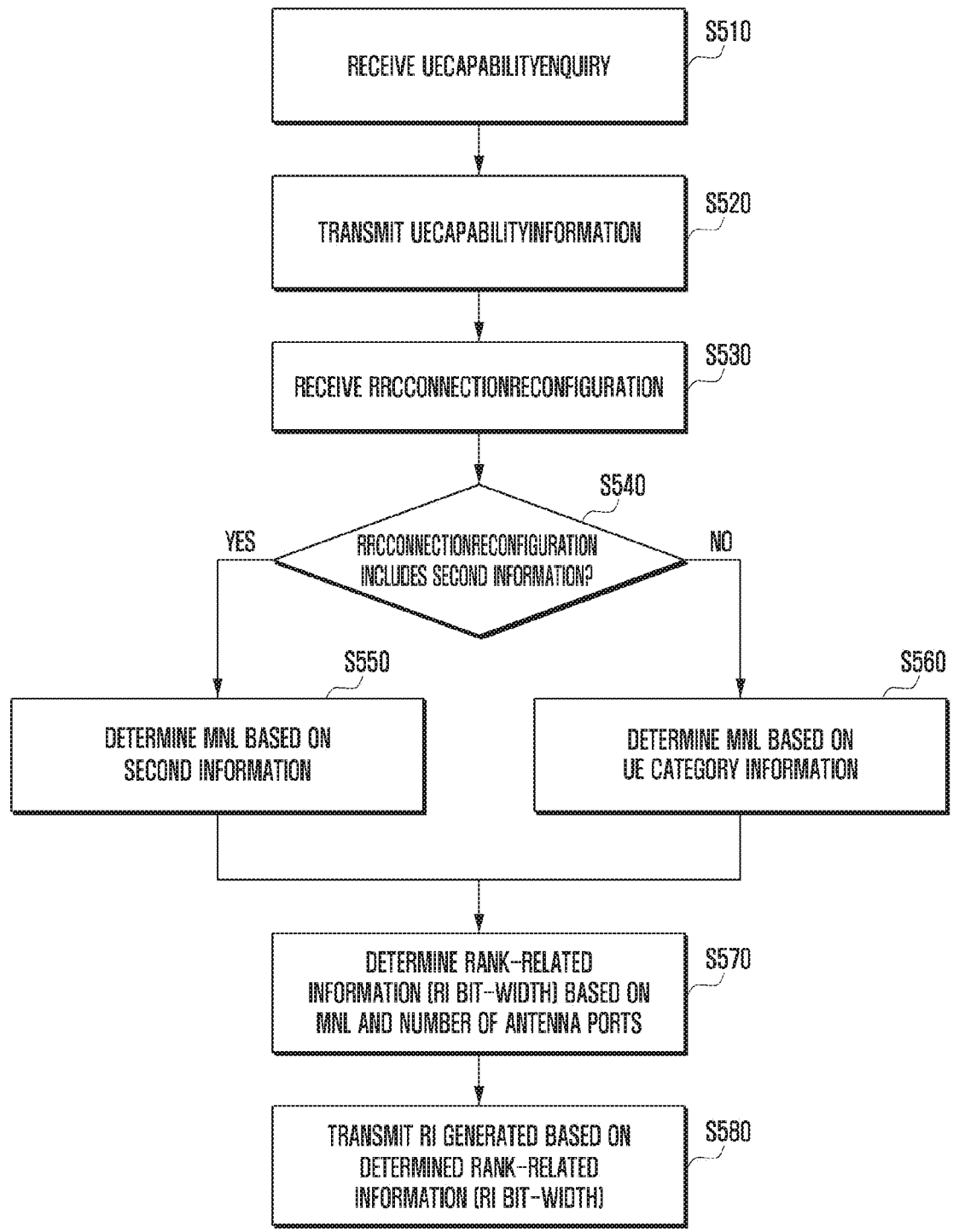
FIG. 5 is a flowchart illustrating a rank-related information determination procedure of a UE according to an embodiment of the present invention.

FIG. 5 is a flowchart illustrating a rank-related information determination procedure of a UE according to an embodiment of the present invention.

In reference to FIG. 5, the UE may receive a UE capability enquiry (UECapabilityEnquiry) message from an eNB at step S510. The UE may receive RAT type information. The present invention is directed to an exemplary case where the RAT type is set to EUTRA. Accordingly, the UE may receive the UE capability enquiry (UECapabilityEnquiry) message including the RAT type field set to EUTRA.

If the UE capability enquiry message is received, at step S520 the UE may transmit to the eNB a UE capability information (UECapabilityInformation) message including UE capability information. In the UE capability information message, the first information may be included in association with band combination parameters (BandCombinationParameters) of the band combinations fulfilling a predetermined condition or configured in the form of ENUMERATED {supported} in the UE capability information (UE-EUTRA-Capability).

Here, the first information may indicate whether the UE supports TM3 or TM4 with transmission up to 4 layers. Accordingly, if the first information is included or configured in the UE capability information message, this may mean that the UE supports TM3 or TM4 with transmission of up to 4 layers.

If a band combination fulfils the predetermined condition, this may mean that the band combination includes a band supporting rank-3 or rank-4 in TM3 or TM4.

After transmitting the UE capability information (UECapabilityInformation) message, the UE may receive a control message (or configuration message) from the eNB at step S530. The control message may be an RRC control message (e.g., RRC connection reconfiguration message) including a transmission mode indicator set to TM3 or TM4 for at least one serving cell. The transmission mode of a serving cell may be indicated by an information element (IE) called PhysicalConfigDedicated.

Upon receipt of the RRC connection reconfiguration message from the eNB, the UE may determine at step S540 whether the RRC connection reconfiguration message includes the second information. In detail, the UE may determine whether the second information is included or configured in the PhysicalConfigDedicated IE for the serving cell configured with TM3 or TM4. The second information may be provided in the form of ENUMERATED {supported}, ENUMERATED {fourLayer, eightLayer}, ENUMERATED {two layer, fourLayer, eightLayer}, or ENUMERATED {fourLayer, eightLayer, spare 1, spare 2}.

The UE may determine the MNL at step S550 or S560.

In detail, if the RRC connection reconfiguration message includes the second information, the UE may determine the MNL based on the second information (first method) at step S550. The UE configured with at least one serving cell operating in TM3 or TM4 may determine the MNL for the corresponding cell using the first constant and the first method. As described above, the first constant may also be determined based on the second information. The above-described first method may be differently explained as follows.

If TM3 or TM4 is configured, if a supportedMIMOCapabilityDL-r10 field is included in the UE capability information (UE-EUTRA-Capability), and if the second information is included in the RRC connection reconfiguration message, the MNL is the smallest one of the first constant determined based on the second information and the number of PBCH antenna ports, or if TM3 or TM4 is configured and if the second information is included in the RRC connection reconfiguration message, the MNL is determined based on the second information.

The detailed description thereof has already been made with reference to FIG. 4 and thus is omitted herein.

In contrast, if the second information is not included in the RRC connection reconfiguration message, at step S560 the UE may determine the MNL based on the category information (ue-Category). In detail, a UE configured with at least one serving cell operating in TM3 or TM4 may determine the MNL for the corresponding serving cell using the second constant and the second method. As described above, the second constant may be determined based on the category information (ue-Category). The above-described second information may be differently explained as follows.

[Alternative Explanation of Second Method]

If TM3 or TM4 is configured, if the supportedMIMO-CapabilityDL-r10 field is not included in the UE capability information (UE-EUTRA-Capability), or if the second information is not included in the RRC connection reconfiguration message even though the supportedMIMO-CapabilityDL-r10 field is included in the UE capability information (UE-EUTRA-Capability), the MNL is the smallest one of the second constant determined based on the category information (ue-Category) and the number of PBCH antenna ports, or if neither TM3 nor TM4 is configured and if the second information is not included in the RRC connection reconfiguration message, the MNL is the smallest value of the number of PBCH antenna ports and the second constant determined based on the category information.

The detailed description thereof has already been made with reference to FIG. 4 and thus is omitted herein.

After determining the MNL, the UE may determine the rank-related information at step S570. In detail, the UE may determine the rank-related information (RI bit-width) for the serving cell configured with TM3 or TM4 based on the MNL and the number of antenna ports. The detailed description thereof has been made above and thus is omitted herein.

Next, the UE may determine the RI based on the rank-related information (RI bit-width) and transmit the RI to the eNB at step S580. The UE may transmit RI at an interval configured by the eNB.

For example, the UE may transmit the RI indicative of one of rank-1 and rank-2 for the case where the rank-related information (RI bit-width) is determined as 1 or one of rank-1, rank-2, rank-3, and rank-4 for the case where the rank-related information (RI bit-width) is determined as 2.

The above-described operation may be modified a little by determining the rank-related information (RI bit-width) immediately upon detecting the receipt of the second information at step S540. That is, it may be possible to determine the MNL with the second method and the second constant and then the rank-related information (RI bit-width) based on the MNL for the case where the second information is not included in the RRC connection reconfiguration message or to determine the rank-related information (RI bit-width) as a predetermined bit-width (e.g., 2 bits) immediately upon receipt of the second information for the case where the second information is included in the RRC connection reconfiguration message.

It may also be possible for the second information to indicate explicitly the rank-related information (RI bit-width). In this case, if the RRC connection reconfiguration message received from the eNB includes the second information, the UE may determine the rank-related information based on the second information.

Figure 6:
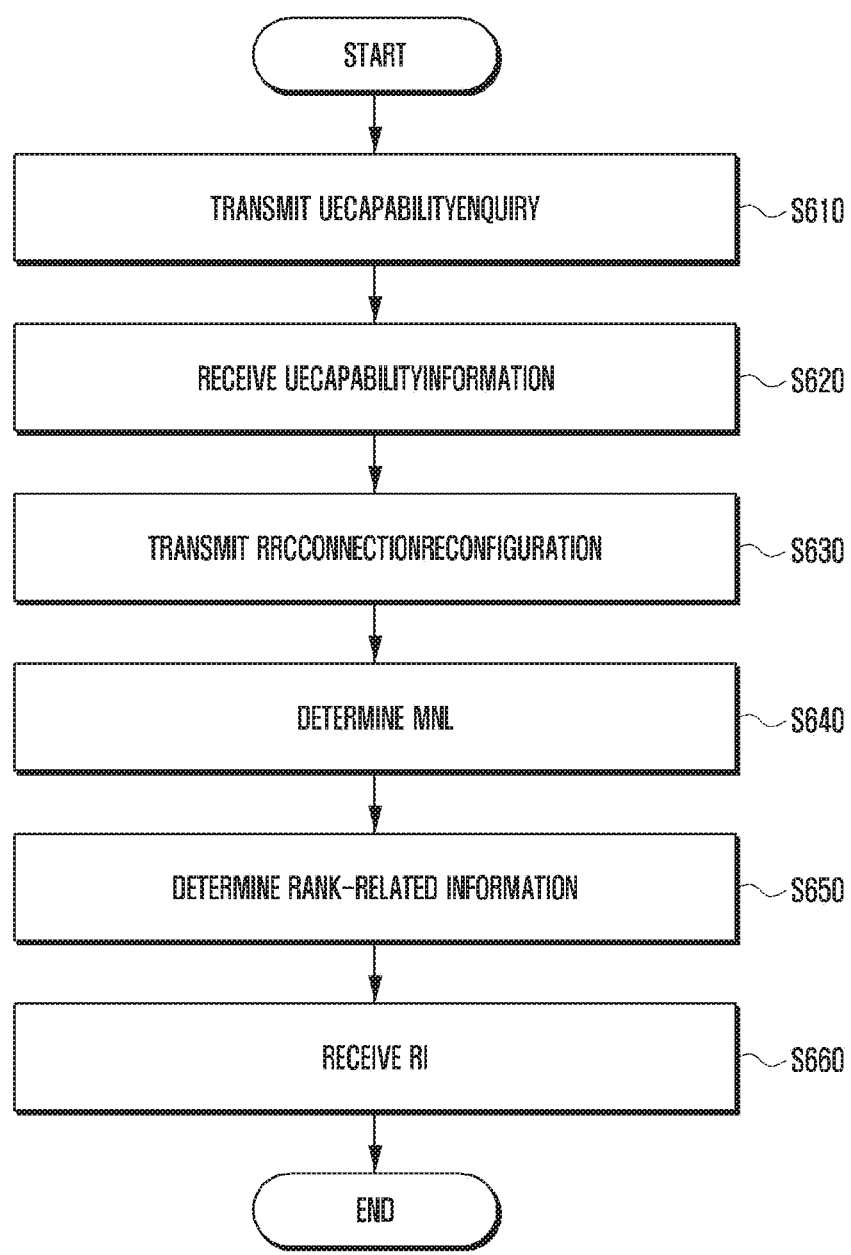
FIG. 6 is a flowchart illustrating a rank-related information determination method of an eNB according to an embodiment of the present invention.

FIG. 6 is a flowchart illustrating a rank-related information determination method of an eNB according to an embodiment of the present invention.

In reference to FIG. 6, the eNB may transmit a UE capability enquiry (UECapabilityEnquiry) message for requesting UE capability information to the UE at step S610. The capability enquiry message may include RAT type information. The present invention is directed to an exemplary case where the eNB transmits the UE capability enquiry message including the RAT type set to EUTRA.

After enquiring UE capability, the eNB may receive a UE capability information (UECapabilityInformation) message including the UE capability information from the UE at step S620. In the UE capability information message, the first information may be included in association with band combination parameters of the band combinations fulfilling a predetermined condition or configured in the form of ENUMERATED {supported}.

The first information may indicate whether the UE supports TM3 or TM4 with transmission up to 4 layers. Accordingly, if the first information is included or configured in the UE capability information message, this may mean that the UE supports TM3 or TM4 with transmission of up to 4 layers.

If a band combination fulfils the predetermined condition, this may mean that the band combination includes a band supporting rank-3 or rank-4 in TM3 or TM4.

After receiving the UE capability information (UECapabilityInformation) message, the eNB may determine whether to allow for transmission of up to 4 layers or use of rank-3/4 in configuring TM3 or TM4 for a band combination configured with the first information.

The eNB may transmit an RRC connection reconfiguration message to the UE at step S630.

The RRC connection reconfiguration message may include a transmission mode indicator indicative of setting the transmission mode of at least one serving cell to TM3 or TM4. The RRC connection reconfiguration message may include second information related to the maximum number of layers for the serving cell configured with TM3 or TM4.

The second information may be provided in the form of ENUMERATED {supported}, ENUMERATED {fourLayer, eightLayer}, ENUMERATED {two layer, fourLayer, eightLayer}, or ENUMERATED {fourLayer, eightLayer, spare 1, spare 2}.

If the second information is included in the RRC connection reconfiguration message, the eNB may determine the MNL at step S640.

If the second information is included in the RRC connection reconfiguration message, the eNB may determine the MNL based on the second information.

In detail, if the transmission mode of at least one serving cell is set to TM3 or TM4, the eNB may determine the MNL for the corresponding cell using the first constant and the first method. As described above, the first constant may be determined based on the second information.

If the transmission mode of the at least one serving cell is set to TM3 or TM4 and if the RRC connection reconfiguration message includes the second information, the eNB may determine the MNL according to the second information.

The eNB may determine the MNL as a predetermined value. The detailed description thereof has been made above and thus is omitted herein.

If the RRC connection reconfiguration message includes no second information, the eNB may determine the MNL based on the category information of the UE.

In detail, if the transmission mode of the at least one serving cell is set to TM3 or TM4, the eNB may determine the MNL for the corresponding cell using the second constant and the second method. As described above, the second constant may be determined based on the category information (ue-Category). The detailed description thereof has already been made above and thus is omitted herein.

After determining the MNL, the eNB may determine rank-related information at step S650. The eNB may determine the rank-related information for the serving cell configured with TM3 or TM4 based on the MNL and the number of antenna ports.

At step S660, the UE may receive an RI determined based on the rank-related information. The eNB may receive the RI periodically.

For example, the eNB may receive the RI indicative of one of rank-1 and rank-2 for the case where the rank-related information (RI bit-width) is determined as 1 or one of rank-1, rank-2, rank-3, and rank-4 for the case where the rank-related information (RI bit-width) is determined as 2.

If the eNB has transmitted the control information including the second information at step S630, it may determine the rank-related information immediately based on the second information.

For example, if the RRC connection reconfiguration message includes the second information, the eNB may determine the rank-related information as a predetermined bit-width (e.g., 2 bits).

It may also be possible for the second information to indicate explicitly the rank-related information. In this case, if the RRC connection reconfiguration message includes the second information, the eNB may determine the rank-related information based on the second information.

Figure 7:
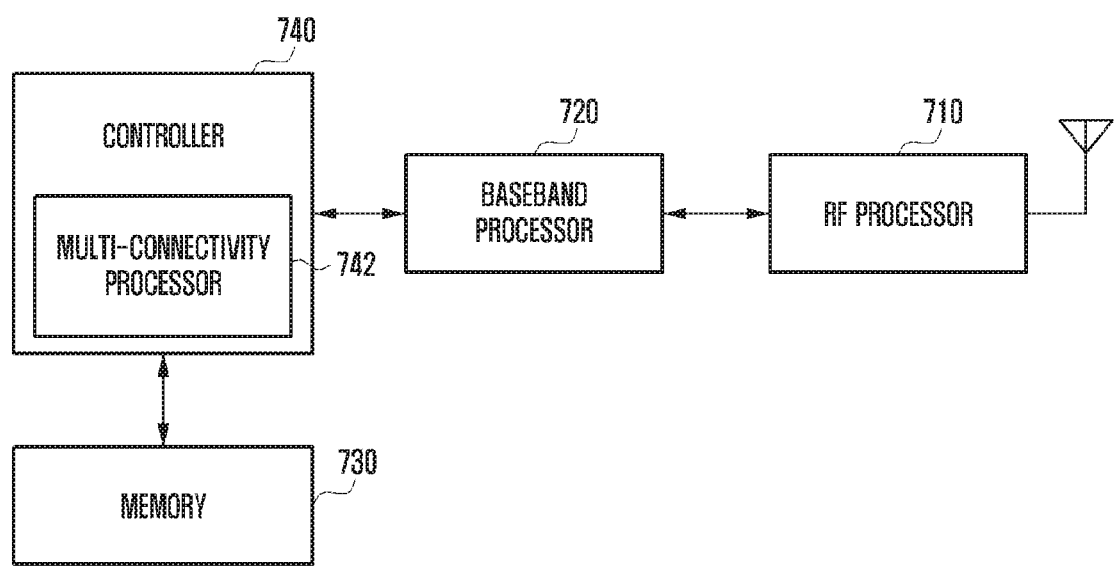
FIG. 7 is a block diagram illustrating a configuration of a UE according to an embodiment of the present invention.

FIG. 7 is a block diagram illustrating a configuration of a UE according to an embodiment of the present invention.

In reference to FIG. 7, the UE may include a radio frequency (RF) processor 710, a baseband processor 720, a memory 730, and a controller 740.

The RF processor 710 takes charge of signal band conversion and amplification for transmitting signals over a radio channel. That is, the RF processor 1410 up-converts a baseband signal output from the baseband processor 720 to an RF band signal for transmission through antennas and down-converts an RF band signal received through the antennas to a baseband signal. For example, the RF processor 1410 may include a transmission filter, a reception filter, an amplifier, a mixer, an oscillator, a Digital-to-Analog Converter (DAC), and an Analog-to-Digital Convertor (ADC). Although one antenna is depicted in FIG. 7, the terminal may include a plurality of antennas. The RF processor 710 may include a plurality of RF chains. The RF processor 710 may perform beamforming. For beamforming, the RF processor 710 may adjust the phases and sizes of the signal transmitted/received through the antennas or antenna elements. The RF processor 710 may perform a MIMO operation and receive multiple layers in the MIMO operation.

The baseband processor 720 takes charge of conversion between baseband signals and bit strings according to a physical layer protocol of the system. For example, the baseband processor 720 performs encoding and modulation on the transmit bit strings to generate complex symbols in data transmission mode. The baseband processor 720 also performs demodulation and decoding on the baseband signal from the RF processor to recover the received bit strings in data reception mode. For the case of an orthogonal frequency division multiplexing (OFDM) system, the baseband processor 1420 performs encoding and modulation on the transmit bit string to generate complex symbols, maps the complex symbols to subcarriers, performs Inverse Fast Fourier Transform (IFFT) on the subcarriers, and inserts a Cyclic Prefix (CP) to generate OFDM symbols in the data transmit mode. The baseband processor 720 splits the baseband signal from the RF processor 710 into OFDM symbols, recovers the signals mapped to the subcarriers through Fast Fourier Transform (FFT), and performs demodulation and decoding to recover the bit strings in the data reception mode.

The baseband processor 720 and the RF processor 710 take charge of transmitting and receiving signals as described above. Accordingly, the baseband processor 720 and the RF processor 710 may be referred to as a transmission unit, a reception unit, a transceiver, or a communication unit. At least one of the baseband processor 720 and the RF processor 710 may include a plurality of communication modules for supporting different radio access technologies. At least one of the baseband processor 720 and the RF processor 710 may include a plurality of communication modules for processing different frequency band signals. Examples of the radio access technologies include WLAN (e.g., IEEE 802.11) and cellular network (e.g., LTE). Examples of the different frequency bands may include Super High Frequency (SHF) band (e.g., 2.5 GHz and 5 GHz) and millimeter wave (mmWave) bands (e.g., 60 GHz).

The memory 730 stores basic programs for operation of the terminal, application programs, and data such as configuration information. In particular, the memory 730 may store Table 1 as the information for use in determining the rank-related information and Table 2 as the information for use in determining the MNL based on the category information of the UE. The memory 730 provides the stored data in response to a request from the controller 740.

The controller 740 controls overall operations of the terminal. For example, the controller 740 controls the baseband processor 720 and the RF processor 710 to transmit/receive signals. The controller 740 also writes and reads data to and from the memory 730. In order to accomplish this, the controller 740 may include at least one processor. For example, the controller 740 may include a communication processor (CP) for controlling communication and an application processor (AP) for controlling higher layers such as application programs. According to an embodiment of the present invention, the controller 740 may control the UE to perform the UE operations and procedures described with reference to FIGS. 5 and 6.

In detail, the controller 740 may control to establish an RRC connection with an eNB. The RRC connection is established in a random-access procedure in which the controller 704 controls the UE to transmit an RRC connection establishment request message to the eNB, receive an RRC connection establishment message, and transmit an RRC connection establishment complete message.

The controller 740 may control to receive a UE capability enquiry (UECapabilityEnquiry) message. The controller 740 may receive UE capability enquiry message in which a RAT type is set to EUTRA. The controller 740 may control the UE to transmit a UE capability information message to the eNB. The UE capability information may include first information that is associated with band combination parameters of the band combinations fulfilling a predetermined condition or that is configured in the form of ENUMER- ATED {supported}. The detailed description thereof has been made above and thus is omitted herein.

The controller 740 may control to receive an RRC connection reconfiguration message from the eNB. The RRC connection reconfiguration message may include a transmission mode information indicative of setting the transmission mode of the at least one serving cell to TM3 or TM4.

The controller 740 may determine whether the RRC connection reconfiguration message includes second information. The controller 740 may determine whether the second information is included or configured for the serving cell configured with TM3 or TM4.

For example, the second information may be included in the form of ENUMERATED {supported}, ENUMERATED {fourLayer, eightLayer}, ENUMERATED {two layer, four-Layer, eightLayer}, or ENUMERATED {fourLayer, eight-Layer, spare 1, spare 2}.

If the RRC connection reconfiguration message includes second information, the controller 740 may determine the MNL based on the second information. If the transmission mode of the at least one serving cell is set to TM3 or TM4, the controller 740 may determine the MNL for the corresponding cell using the first constant and the first method as described above.

If the transmission mode of the at least one serving cell is set to TM3 or TM4 and if the RRC connection reconfiguration message includes the second information, the controller 740 may determine the MNL based on the second information.

If the RRC connection reconfiguration message includes no second information, the controller 740 may determine the MNL based on category information. If the transmission mode of the at least one serving cell is set to TM3 or TM4, the controller 740 may determine the MNL for the corresponding cell using the second constant and the second method as described above. The controller 740 may also determine rank-related information. The controller 740 may determine the rank-related information for the serving cell configured with TM3 or TM4 based on the MNL and the number of antenna ports. The detailed description thereof has been made above and thus is omitted herein.

The controller 740 may determine an RI based on the rank-related information (RI bit-width) and transmit the RI to the eNB. The rank indicator (RI) may be transmitted periodically according to the configuration of the eNB.

For example, if the rank-related information (RI bit-width) is determined as 1, the controller 740 may control to transmit the RI indicative of one of rank-1 and rank-2; if the rank-related information (RI bit-width) is determined as 2, the controller 740 may control to transmit the RI indicative of one of rank-1, rank-2, rank-3, and rank-4.

If the RRC connection reconfiguration message includes the second information, the controller 740 may determine the rank-related information immediately based on the second information.

For example, if the RRC connection reconfiguration message includes the second information, the controller 740 may determine the rank-related information (RI bit-width) immediately as a predetermined bit-width (e.g., 2 bits). The second information may be configured to indicate explicitly the rank-related information (RI bit-width).

Figure 8:
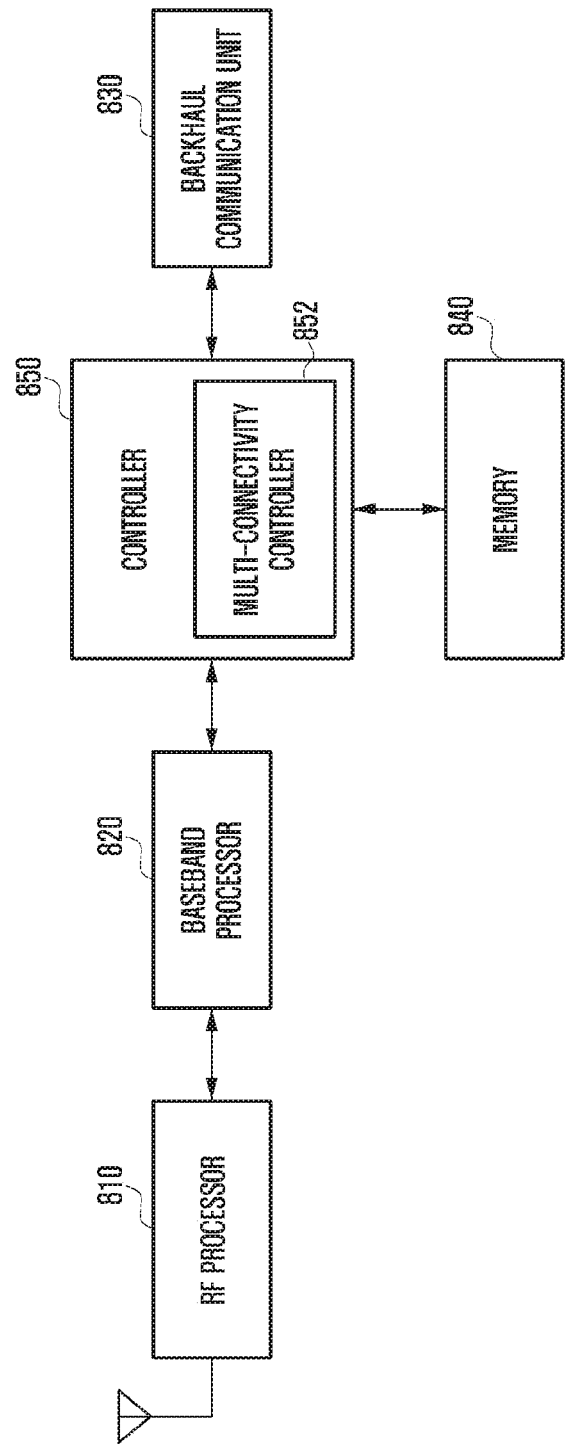
FIG. 8 is a block diagram illustrating a configuration of an eNB according to an embodiment of the present invention.

FIG. 8 is a block diagram illustrating a configuration of an eNB according to an embodiment of the present invention.

As shown in FIG. 8, the eNB includes an RF processor 810, a baseband processor 820, a backhaul communication unit 830, a memory 840, and a controller 850.

The RF processor 810 takes charge of signal band conversion and amplification for transmitting signals over a radio channel. That is, the RF processor 810 up-converts a baseband signal output from the baseband processor 820 to an RF band signal for transmission through antennas and down-converts an RF band signal received through the antennas to a baseband signal. For example, the RF processor 810 may include a transmission filter, a reception filter, an amplifier, a mixer, an oscillator, a DAC, and an ADC. Although one antenna is depicted in FIG. 15, the first connection node may include a plurality of antennas. The RF processor 810 may include a plurality of RF chains. The RF processor 810 may perform beamforming. For beamforming, the RF processor 810 may adjust the phases and sizes of the signal transmitted/received through the antennas or antenna elements. The RF processor 810 may perform the downlink MIMO operation of transmitting one or more layers.

The baseband processor 820 takes charge of conversion between baseband signals and bit strings according to a physical layer protocol of the system. For example, the baseband processor 820 performs encoding and modulation on the transmit bit strings to generate complex symbols in data transmission mode. The baseband processor 820 also performs demodulation and decoding on the baseband signal from the RF processor to recover the received bit strings in data reception mode. For the case of an OFDM system, the baseband processor 820 performs encoding and modulation on the transmit bit string to generate complex symbols, maps the complex symbols to subcarriers, performs IFFT on the subcarriers, and inserts a CP to generate OFDM symbols in the data transmit mode. The baseband processor 820 splits the baseband signal from the RF processor 810 into OFDM symbols, recovers the signals mapped to the subcarriers through FFT, and performs demodulation and decoding to recover the bit strings in the data reception mode. The baseband processor 820 and the RF processor 810 take charge of transmitting and receiving signals as described above. Accordingly, the baseband processor 820 and the RF processor 810 may be referred to as a transmission unit, a reception unit, a transceiver, a communication unit or a wireless communication unit.

The backhaul communication unit 830 provides an interface for communication with other network nodes. That is, the backhaul communication unit 830 converts the bit string to be transmitted to the eNB and core network to a physical signal and the physical signal received from another node to a bit string.

The memory 840 stores basic programs for operation of the eNB, application programs, and data such as configuration information. In particular, the memory 840 may store the information on the bearers allocated to the connected UE and a measurement result reported by the UE. The memory 840 may store Table 1 as the information for use in determining the rank-related information and Table 2 as the information for use in determining the MNL based on the category information of the UE. The memory 840 may also store the information as criteria for determining whether to enable or disable multi-connectivity for the UE. The memory 840 provides the stored data in response to a request from the controller 850.

The controller 850 may control overall operations of the eNB. For example, the controller 850 controls the baseband processor 820, the RF processor 810, and the backhaul communication unit 830 for transmitting/receiving signals. The controller 850 also writes and reads data to and from the memory 840. In order to accomplish this, the controller 840 may include at least one processor. According to an embodiment of the present invention, the controller 850 includes a multi-connectivity controller 852 for controlling multi-connectivity of the UE. For example, the controller 850 may control the eNB to perform the operations and procedures as shown in FIGS. 4 and 6.

In detail, the controller 850 may establish an RRC connection with a UE. The RRC connection is established in a random-access procedure in which the controller 850 controls the eNB to receive an RRC connection request message from the UE, transmit an RRC connection setup message to the UE, and receive an RRC connection setup complete message from the UE. The controller 850 may control to transmit a UE capability enquiry (UECapabilityEnquiry) message to request for UE capability information. Here, the UE capability enquiry message may include a RAT type field set to EUTRA. The controller 850 may control to receive the UE capability information (UECapabilityInformation) message including the UE capability information. The UE capability information may include first information that is associated with band combination parameters of the band combinations fulfilling a predetermined condition or that is configured in the form of ENUMERATED {supported}. The detailed description thereof has been made above and thus is omitted herein.

The controller 850 may determine whether to allow use of up to 4 layers or whether to use rank-3/4 in configuring TM3 or TM4 for the band combination configured with the first information.

The controller 850 may control to transmit an RRC connection reconfiguration message to the UE. The RRC connection reconfiguration message may include a transmission mode information indicative of setting the transmission mode of the at least one serving cell to TM3 or TM4. The RRC connection reconfiguration message may also include second information related to the MNL for the serving cell configured with TM3 or TM4.

The second information may be included in the form of ENUMERATED {supported}, ENUMERATED {fourLayer, eightLayer}, ENUMERATED {two layer, fourLayer, eightLayer}, or ENUMERATED {fourLayer, eightLayer, spare 1, spare 2}.

If the RRC connection reconfiguration message includes second information, the controller 850 may determine the MNL based on the second information.

In detail, if the transmission mode of the at least one serving cell is set to TM3 or TM4, the controller 850 may determine the MNL for the corresponding cell using the first constant and the first method, the first constant being determined based on the second information as described above. The detailed description thereof has been made above and thus is omitted herein.

If the transmission mode of the at least one serving cell is set to TM3 or TM4 and if the RRC connection reconfiguration message includes the second information, the eNB may determine the MNL based on the second information.

If the RRC connection reconfiguration message includes no second information, the controller 850 may determine the MNL based on the category information of the UE.

In detail, if the transmission mode of the at least one serving cell is set to TM3 or TM4, the controller 850 may determine the MNL for the corresponding cell using the second constant and the second method. As described above, the second constant may be determined based on the category information (ue-Category). The detailed description thereof has been made above and thus is omitted herein.

The controller 850 may determine rank-related information. The controller 850 may determine the rank-related information for the serving cell configured with TM3 or TM4 based on the MNL and the number of antenna ports.

The controller 850 may receive an RI determined based on the rank-related information. The controller 850 may receive the RI periodically.

For example, if the rank-related information (RI bit-width) is determined as 1, the controller 850 may control to receive the RI indicative of one of rank-1 and rank-2; if the rank-related information (RI bit-width) is determined as 2, the controller 850 may control to receive the RI indicative of one of rank-1, rank-2, rank-3, and rank-4.

If the RRC connection reconfiguration message includes the second information, the controller 850 may determine the rank-related information immediately based on the second information.

For example, if the RRC connection reconfiguration message includes the second information, the controller 850 may determine the rank-related information (RI bit-width) immediately as a predetermined bit-width (e.g., 2 bits). The second information may be configured to indicate explicitly the rank-related information (RI bit-width).

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method comprising:
   transmitting a user equipment (UE) capability message including UE capability information to a base station, wherein the UE capability information includes first information indicating that the UE supports 4-layer spatial multiplexing for transmission mode 3 and transmission mode 4 for a band combination in case that the UE supports 4-layer spatial multiplexing for transmission mode 3 and transmission mode 4;
   receiving a configuration message from the base station; and
   determining, in case that the configuration message includes second information indicating a maximum number of layers, a maximum number of layers based on the second information; and
   determining, based on third information, a maximum number of layers in case that the second information is not included in the configuration message and the third information is included in the UE capability information,
   wherein the second information is configured to 4 layers in case that the transmission mode is set to transmission mode 3 or transmission mode 4, and
   wherein the third information indicates a number of layers for spatial multiplexing supported by the UE.

2. The method of claim 1, wherein determining the maximum number of layers based on the second information comprises:
   determining bit widths for a rank indication (RI) based on the maximum number of layers determined based on the second information.

3. The method of claim 1, wherein determining the maximum number of layers based on the third information comprises:

determining bit widths for a rank indication (RI) based on the maximum number of layers determined based on the third information.

4. The method of claim 1, wherein a maximum number of layers is determined based on a minimum number of antenna ports and a UE category included in the UE capability information in case that the second information is not included in the configuration message and the third information is not included in the UE capability information.

5. A method of a base station, the method comprising:
receiving a user equipment (UE) capability message including UE capability information from a UE, wherein the UE capability information includes first information indicating that the UE supports 4-layer spatial multiplexing for transmission mode 3 and transmission mode 4 for a band combination in case that the UE supports 4-layer spatial multiplexing for transmission mode 3 and transmission mode 4;
transmitting a configuration message to the UE; and
determining, in case that the configuration message includes second information indicating a maximum number of layers, a maximum number of layers based on the second information, and
determining, based on third information, a maximum number of layers in case that the second information is not included in the configuration message and the third information is included in the UE capability information,
wherein the second information is configured to 4 layers in case that the transmission mode is set to transmission mode 3 or transmission mode 4, and
wherein the third information indicates a number of layers for spatial multiplexing supported by the UE.

6. The method of claim 5, wherein determining the maximum number of layers based on the second information comprises:
determining bit widths for a rank indication (RI) based on the maximum number of layers.

7. The method of claim 5, wherein determining the maximum number of layers based on the third information comprises:
determining bit widths for a rank indication (RI) based on the maximum number of layers.

8. The method of claim 5, wherein a maximum number of layers is determined based on a minimum number of antenna ports and a UE category included in the UE capability information in case that the second information is not included in the configuration message and the third information is not included in the UE capability information.

9. A user equipment (UE) comprising:
a transceiver; and
a controller configured to:
transmit, via the transceiver, a UE capability message including UE capability information to a base station, wherein the UE capability information includes first information indicating that the UE supports 4-layer spatial multiplexing for transmission mode 3 and transmission mode 4 for a band combination in case that the UE supports 4-layer spatial multiplexing for transmission mode 3 and transmission mode 4,
receive, via the transceiver, a configuration message from the base station, and
determine, in case that the configuration message includes second information indicating a maximum number of layers, a maximum number of layers based on the second information, and
determine, based on third information, a maximum number of layers in case that the second information is not included in the configuration message and the third information is included in the UE capability information,
wherein the second information is configured to 4 layers in case that the transmission mode is set to transmission mode 3 or transmission mode 4, and
wherein the third information indicates a number of layers for spatial multiplexing supported by the UE.

10. The UE of claim 9, wherein the controller is further configured to:
determine bit widths for a rank indication (RI) based on the maximum number of layers determined based on the second information.

11. The UE of claim 9, wherein the controller is further configured to:
determine bit widths for a rank indication (RI) based on the maximum number of layers determined based on the third information.

12. The UE of claim 9, wherein a maximum number of layers is determined based on a minimum number of antenna ports and a UE category included in the UE capability information in case that the second information is not included in the configuration message and the third information is not included in the UE capability information.

13. A base station comprising:
a transceiver; and
a controller configured to:
receive, via the transceiver, a user equipment (UE) capability message including UE capability information from a UE, wherein the UE capability information includes first information indicating that the UE supports 4-layer spatial multiplexing for transmission mode 3 and transmission mode 4 for a band combination in case that the UE supports 4-layer spatial multiplexing for transmission mode 3 and transmission mode 4,
transmit, via the transceiver, a configuration message to the UE, and
determine, in case that the configuration message includes second information indicating a maximum number of layers, a maximum number of layers based on the second information, and
determine, based on third information, a maximum number of layers in case that the second information is not included in the configuration message and the third information is included in the UE capability information,
wherein the second information is configured to 4 layers in case that the transmission mode is set to transmission mode 3 or transmission mode 4, and
wherein the third information indicates a number of layers for spatial multiplexing supported by the UE.

14. The base station of claim 13, wherein the controller is further configured to:
determine bit widths for a rank indication (RI) based on the maximum number of layers determined based on the second information.

15. The base station of claim 13, wherein the controller is further configured to:
determine bit widths for a rank indication (RI) based on the maximum number of layers determined based on the third information.

16. The base station of claim 13, wherein a maximum number of layers is determined based on a minimum number of antenna ports and a UE category included in the UE capability information in case that the second information is not included in the configuration message and the third information is not included in the UE capability information.

17. The method of claim 1, wherein the second information is configured in case that the transmission mode is set to 3, 4, 9, or 10.

18. The method of claim 5, wherein the second information is configured in case that the transmission mode is set to 3, 4, 9, or 10.

19. The UE of claim 9, wherein the second information is configured in case that the transmission mode is set to 3, 4, 9, or 10.

20. The base station of claim 13, wherein the second information is configured in case that the transmission mode is set to 3, 4, 9, or 10.

* * * * *